United States Patent Office 3,365,945
Patented Jan. 30, 1968

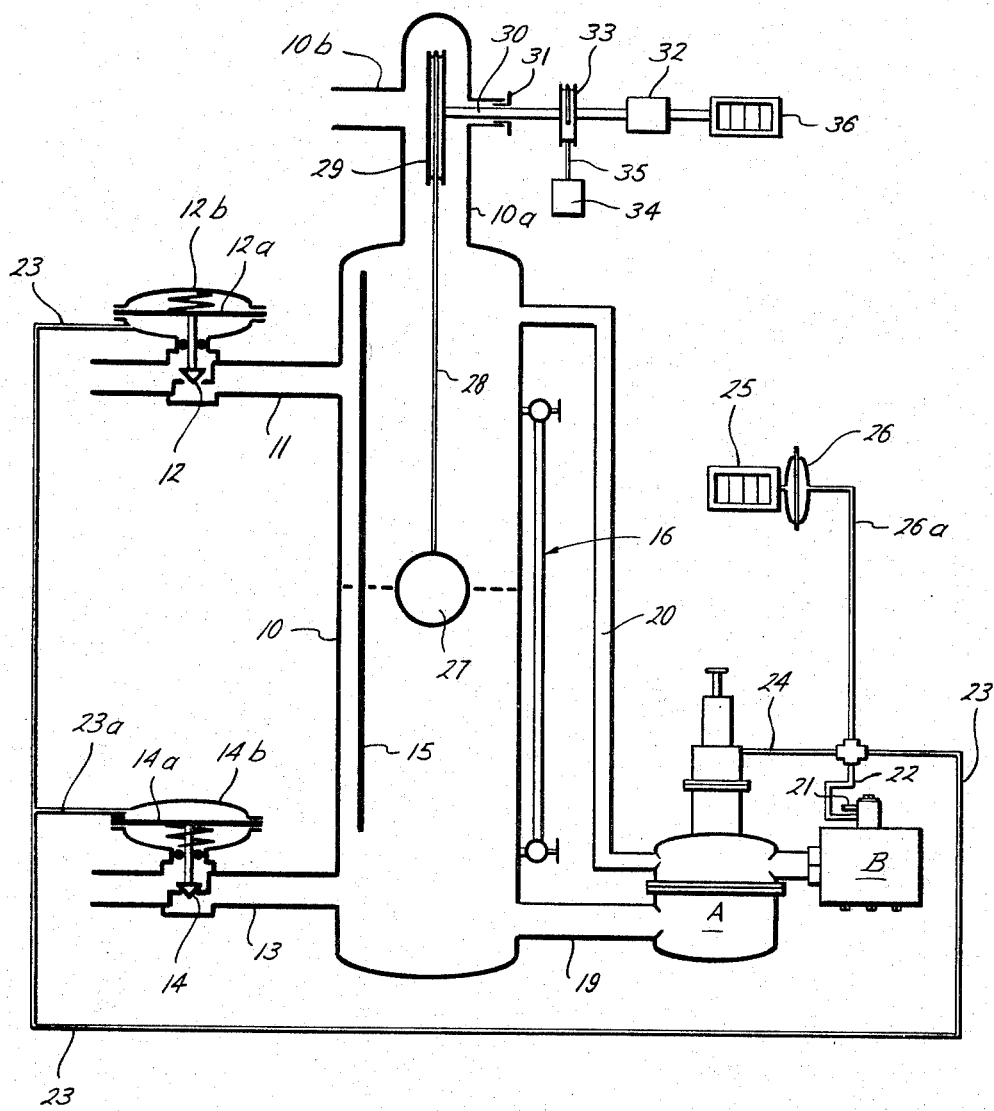

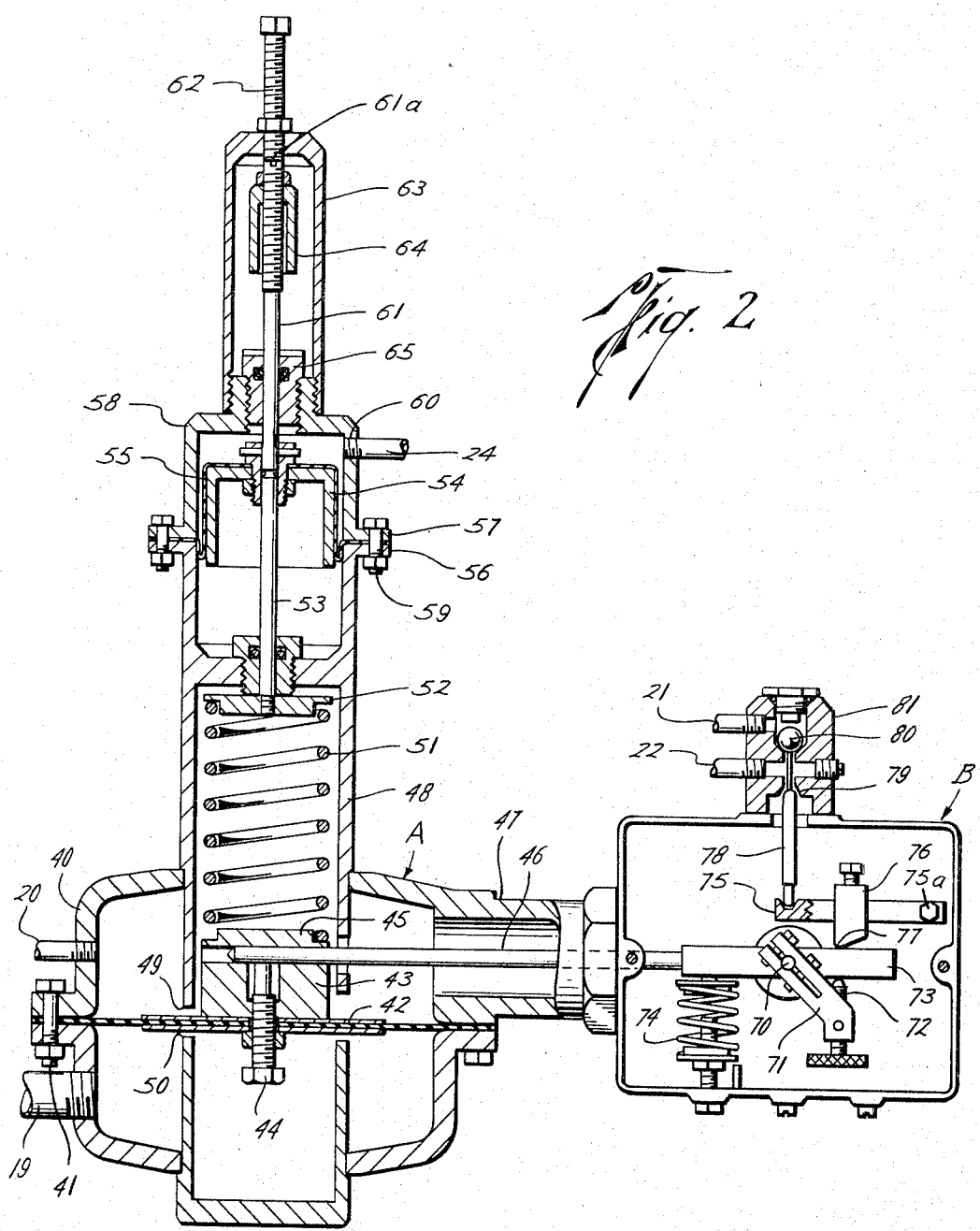

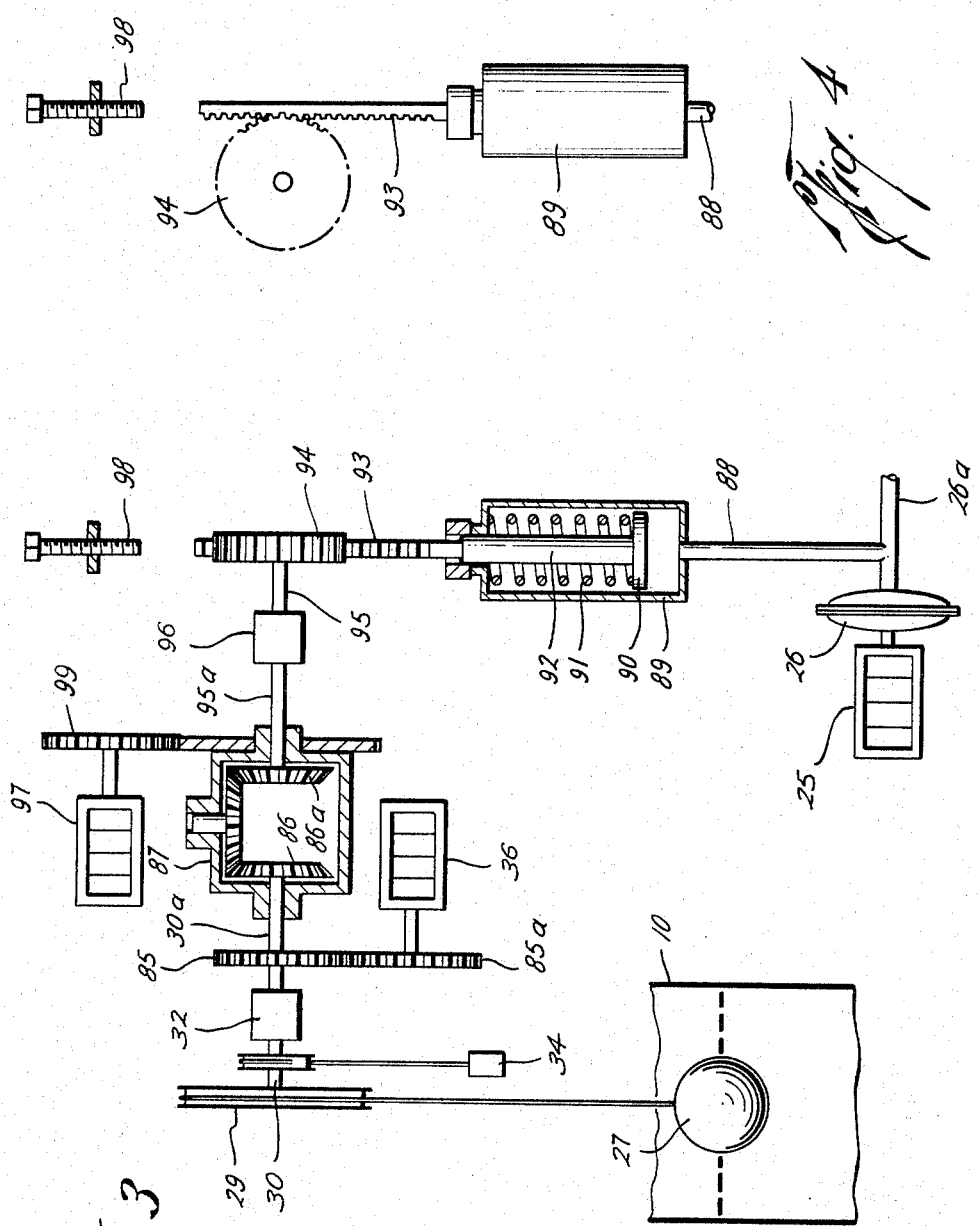

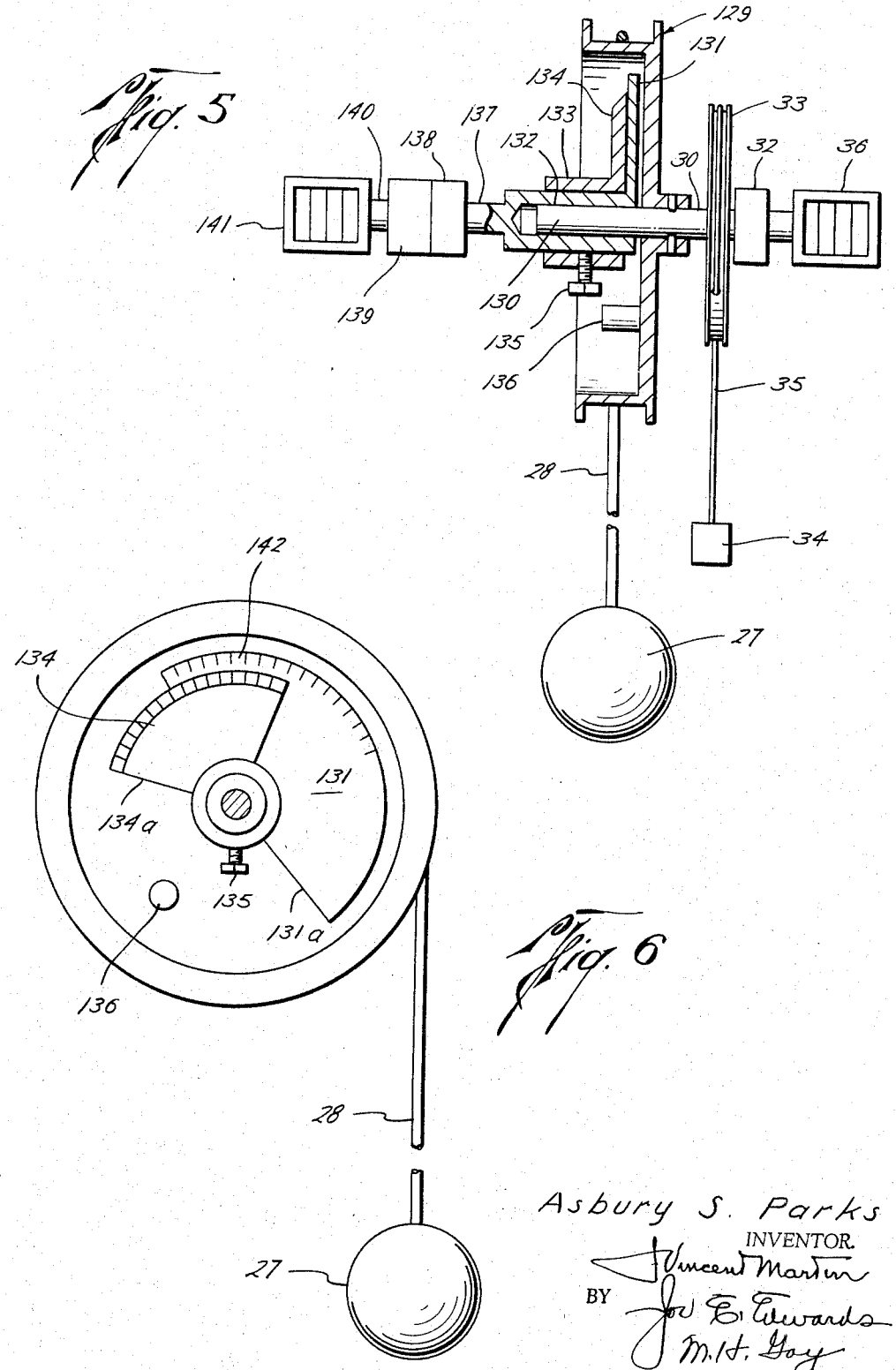

3,365,945
APPARATUS FOR METERING LIQUIDS
Asbury S. Parks, Houston, Tex., assignor to Dover Corporation, W. C. Norris Division, Tulsa, Okla., a corporation of Delaware
Continuation of application Ser. No. 286,240, June 7, 1963. This application Dec. 6, 1966, Ser. No. 599,644
14 Claims. (Cl. 73—223)

ABSTRACT OF THE DISCLOSURE

The present invention is directed to a metering apparatus which accurately determines the volume of each component of a liquid mixture, as for example, a water and oil mixture. The invention utilizes an immovable vessel into which a predetermined or controlled weight of the liquid mixture is introduced and the height to which said predetermined weight of liquid mixture rises within the vessel is measured to indicate the total volume of the mixture. Since the density of each component of the mixture is known, the determination of the relationship of weight to volume provides an accurate measurement of the relative volume of each component contained in the mixture.

---

This application is a continuation of my prior application, Ser. No. 286,240, filed June 7, 1963, now abandoned.

This invention relates to new and useful improvements in means for metering liquids and relates particularly to the metering of well streams comprising a mixture of oil and water.

As is well known in the production of oil and gas from wells, water is frequently produced, and, in such instances, it is essential that the relative amount of oil and water be determined. In older oil fields where water drive techniques are employed to flush out residual oil from the reservoir, water will eventually be produced from all wells in the area, and the metering of both water and oil to determine the volume of each is of great importance.

Various metering devices and apparatus have been used to measure the volume of total liquid produced from each well, but determination of the amount of oil and the amount of water in the well stream presents a different problem. In the past, this has been done by first separating the components and metering each separately; or, the stream has been constantly sampled with each sample subsequently tested to determine the percent of oil and water. Some attempts have been made to provide an apparatus which involves the weighing of a known volume of the mixture of oil and water. The densities of the oil and water separately are readily determined so that the calculation of the percent of oil and water in a mixture may be made if the weight of a given volume of mixture is known, along with the densities of the two liquids.

The separation of oil and water to render each component capable of independent metering is quite difficult because many crude oils form stable emulsions with water and separation may involve the use of heat or chemicals or both; even when so separated there is no assurance that the oil is completely free of water which means that continuous sampling is still required to be certain of complete separation. The mechanics of sampling a stream of liquids composed of oil, water and emulsions not only involves time and expense, but is also subject to error and cannot be said to be conclusive.

With respect to the past efforts to weigh a given volume of a mixture of liquids in a cyclic manner, these have not been successful because of certain inherent difficulties in a system of this type. First, to weigh a predetermined volume of liquid, the volume must be exactly the same each cycle; and, secondly, the weighing mechanism must be capable of accurately measuring the weight of the vessel and the liquid in the vessel upon each cycle. In a mixture of oil and water as produced from a well, the weight per volume can vary drastically from one cycle to the next. The mechanical problems involved in automatically filling and dumping a vessel to an exact volume each cycle, then accurately measuring weight of vessel and weight of liquid, recording or totalizing the weights of the oil and water, and eliminating the effect on both volume and weight of the liquid contained in the piping to and from the vessel, render this type of system unreliable in actual practice.

It is, therefore, one object of this invention to provide an improved means for metering a mixture of liquids, such as water and oil, so that accurate volumetric measurements of the components may be accomplished without the practical disadvantages of prior systems and apparatus.

An important object is to provide an improved apparatus for metering a mixture of liquids to accurately determine the relative volumes of the components of the mixture by introducing a predetermined weight of the liquid mixture into a vessel, then determining the volume of said predetermined weight of liquid so introduced, and relating said weight to said volume, which, by reason of the known densities of the components of the mixture, provides an accurate measurement of the percent of each component present in the mixture.

A further object is to provide a metering apparatus which is particularly adaptable for use in determining the relative amount of water and oil in a well stream wherein a predetermined weight of the well stream mixture is introduced into a constant diameter vessel, and also wherein the height to which said predetermined weight of well stream mixture, which height is directly proportional to volume, is measured, whereby the relationship of said weight to said volume, when considered in the light of the known densities of the material, accurately indicates the percent of each component in the mixture; the apparatus lending itself to a cyclic metering system in which the liquid is alternately introduced and discharged by a conventional valving arrangement, and in which a simple float structure may be employed to measure the volume of liquid passing through the vessel.

Still another object is to provide an apparatus, of the character described, which may employ standard liquid head measuring devices which control the admission and discharge of the liquid of predetermined weight into the vessel, or which may, in lieu thereof, include an improved single unit liquid head sensing device capable of accurately and sensitively sensing said head to actuate the valving which admits and discharges the liquid; said single unit sensing device having means for automatically adjusting the same to assure accurate control of both upper and lower liquid levels, as determined by the weight of the liquid, in the metering vessel.

A particular object is to provide an apparatus, of the character described, in which separate measurements of weight and volume of the liquid may be made and subsequently related, or in which said separate measurements may be automatically integrated to indicate the volume of one of the components, as for example the percent of oil or water in the well stream being metered.

Other objects will appear hereinafter.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIGURE 1 is a schematic diagram of the improved metering apparatus, constructed in accordance with the invention, for carrying out the improved method;

FIGURE 2 is a transverse sectional view of the liquid head sensing device and also showing one type of pilot pressure control unit which may be employed therewith;

FIGURE 3 is a sectional view of one type of integrator device which will correlate the measurements of weight and volume to indicate the percent of one of the components in the mixture;

FIGURE 4 is a side elevation of the actuating piston, which is actuated by the weight measurement, of the device shown in FIGURE 3;

FIGURE 5 is a sectional view of another form of integrator device; and,

FIGURE 6 is a front elevation of the indicator dial of the device shown in FIGURE 5.

In the drawings, the numeral 10 designates a vessel which may be in the form of a tank and which has a cross-section about its vertical axis which is constant; if the vessel is circular in cross-section, it would have a constant diameter throughout its height. An inlet conductor 11 for conducting a liquid mixture, such as the well stream containing water and oil, from a suitable source (not shown) is connected into the upper portion of the vessel, and the flow through said inlet conductor is controlled by an inlet valve 12. The valve is connected to a diaphragm 12a mounted within a case 12b in the usual manner so that said valve is opened or closed by movement of the diaphragm. A discharge or outlet conductor 13 extends from the lower portion of the vessel and has an outlet valve 14 connected therein; as is the case with the inlet valve, the outlet valve 14 is connected to an operating diaphragm 14a mounted within the usual case 14b. The valves 12 and 14 are generally referred to as motor valves and, as will be hereinafter explained, are adapted to be operated by a pilot pressure.

Within the vessel 10 and adjacent that side of the vessel to which the inlet and outlet conductors are connected is a vertically extending baffle 15, and its function is to direct the liquid mixture downwardly along one wall of the vessel at it enters from the inlet conductor to thereby reduce turbulence and agitation within the vessel. A suitable gauge glass assembly, generally indicated at 16, may be connected with the vessel so that the liquid level within the interior of the vessel may be observed from the exterior.

A weight-sensing device A, which is adapted to sense the weight of the liquid which is introduced into the vessel through the inlet conductor, has connection with the lower end of the vessel 10 through a communicating line or pipe 19. It is noted that the line 19 lies in a plane which is below the outlet or discharge conductor 13, so that the device A will sense the weight of the liquid within the vessel which is above the discharge line. A balancing or equalizing line 20 communicates a portion of the sensing device A with the upper portion of the vessel 10 so that any gas pressure in the upper end of said vessel may be cancelled out to provide for an accurate operation of the weight-sensing device A, as will be hereinafter explained in detail.

The weight-sensing device A is adapted to acutaute a pilot pressure control unit generally indicated at B. A pilot pressure supply is furnished to the unit B through a supply conductor 21, and when the unit is actuated pilot pressure is directed through an outlet line 22 to an actuating line 23. The actuating line or conductor is adapted to direct pilot pressure to the underside of the diaphragm 12a of the inlet valve 12 and at the time direct pilot pressure to the upper side of the diaphragm 14a of outlet valve 14 through a branch line 23a. Thus, when pilot pressure is present in the line or conductor 23, the outlet valve is moved to a seated or closed position while the inlet valve 12 is moved to an unseated or open position. During the period of time that pilot pressure is maintained the outlet valve closed and the inlet valve open, the liquid mixture which is to be measured or metered is flowing into the vessel 10 and will, of course, rise upwardly within said vessel. At the same time that conductor 23 contains pilot pressure, this same pressure is directed through a branch line 24 to the upper portion of the sensing device A, and as will be explained, this pressure functions to permit the sensing device A to properly control two liquid levels in the vessel. In other words, when the liquid level rises to a particular point as determined by the predetermined weight, the sensing device will close the inlet valve and open the outlet valve to permit discharge or dumping of the liquid; after the liquid has reached its lower level above the outlet conductor 13, then the sensing device functions to again reverse the operation to close the outlet and open the inlet. The purpose of applying the pilot pressure through line 24 or releasing said pilot pressure from the sensing device A will be hereinafter described in detail.

Additionally, the application of pilot pressure which is applied to the valves during each cycle may be utilized to actuate a liquid weight counter 25. This is done through the usual pressure pulse actuator 26 which has connection through conductor 26a with the pilot pressure outlet 22 of the pilot control unit B.

The weight-sensing device A functions to weigh the liquid which is introduced into the vessel 10 upon each cycle of operation. It is set so that upon the admission of a predetermined weight of liquid mixture into the vessel it will actuate to dump or discharge such liquid. Therefore, upon each cycle of operation a predetermined weight of liquid mixture is introduced into the vessel, and as soon as this predetermined weight is reached the sensing device A actuates pilot B to open the outlet or discharge valve and to simultaneously close the inlet valve to permit discharge or dumping of that predetermined quantity of weight. As is well known, the weight of a volume of liquid or liquid mixture is directly related to the density of the particular liquid or liquids included in that mixture.

In order to measure the volume of the liquid which passes through the vessel 10 upon each cycle of operation, a float 27 is adapted to ride the surface of the liquid within the vessel. The float is suspended from a cable or wire 28 which passes upwardly and is secured to a relatively large measuring wheel or pulley 29 which is mounted within an upwardly extending dome portion 10a of the vessel. The usual equalizing line 10b extends from the dome portion and communicates with the liquid mixture source (not shown). The measuring wheel or pulley is mounted upon a shaft 30 which extends outwardly through a suitable packing gland and bearing arrangement 31 to the exterior of the vessel, and said shaft is connected with a one-way clutch or ratchet drive assembly 32. A drum or pulley 33 is also secured to the shaft 30 and has a counterweight 34 suspended therefrom by means of a cable 35; the counterweight counterbalances the float 27 and maintains tension in the suspension cable 28, whereby the float 27 may rise and fall with the liquid level.

As the liquid mixture rises within the vessel 10 during each cycle of operation, the float rides upwardly therewith, and this will result in a rotation of the measuring wheel 29 and its shaft 30. The diameter of the measuring wheel is properly calculated so that its rotation is proportional to some unit of volume, such as barrels of liquid. The rotation of the wheel and its shaft 30 is imparted through the one-way clutch or ratchet assembly 32 to a liquid volume counter 36. By properly calculating the size of the measuring wheel 29 the counter device registers the total liquid rise within the vessel in terms of barrels or any other convenient unit of volume, with the result that the total volume of liquid which passes through the vessel on each cycle is measured, and this measurement is made regardless of how large or how small the quantity admitted during a cycle might be.

The purpose of the one-way clutch or ratchet assembly 32 is to prevent transmission of rotation to the counter device as the float moves in a downward direction, which will of course occur on the next cycle of operation or during the time that one batch of liquid is being discharged. By providing the one-way drive connection, it is evident that the float 27 operates the counter 36 only as it rises upwardly within the vessel, and no operation of the counter occurs when the float is moving downwardly.

In the operation of the unit, it will be assumed that the weight-sensing device A has actuated the pilot pressure unit B to apply pressure to the diaphragms 12a and 14a of the inlet and outlet valves 12 and 14, respectively, and it will be further assumed that one cycle of operation is just beginning. At this time, the float 27 will be near the lower end of the vessel, and the liquid mixture is being admitted to the vessel 10. Liquid continues to be introduced until the weight of such liquid acts upon the weight-sensing device A in accordance with the adjustment of that device, so that upon a predetermined weight of liquid being present within the vessel, the sensing device is actuated to operate the pilot control unit B, thereby resulting in a release or venting of pilot pressure from the conductor 23; this relieves the diaphragms 12a and 14a of pilot pressure, and said diaphragms being acted upon by springs function to close the inlet valve 12 and open the discharge valve 14.

As the liquid mixture being introduced during the cycle rises within the vessel, the float 27 is also moving upwardly therewith and, through the measuring wheel or pulley 29, is rotating the shaft to operate the liquid volume counter 36. At the instant that the weight-sensing device A determines that a predetermined weight of liquid is present in the vessel, the valves 12 and 14 are switched in their respective positions and at this same instant the float 27 has measured the volume of the particular predetermined weight of liquid which has been admitted to the vessel upon that cycle of operation. It is therefore evident that upon each cycle of operation the weight-sensing device A assures that a predetermined weight of liquid is introduced and the float simultaneously measures the volume of the liquid introduced during that cycle.

The weight-sensing device A is actuated only by the hydrostatic head of the liquid within the vessel and is not affected by the liquid level. Also, the float 27 is actuated solely by liquid level, and therefore the counter or indicator 36 is responsive to liquid level only. As noted, the cross-sectional area of the vessel is constant, and the weight-sensing device A may be set to dump or discharge any predetermined weight of liquid from the vessel upon each cycle. Obviously the weight of the volume of liquid within the vessel is directly proportional to the height and density of the liquid; the weight-sensing device will sense the hydrostatic head pressure of the liquid at the upper and lower levels and will operate the inlet and outlet valves 12 and 14 accordingly. Obviously, heavy liquid will fill and dump over a shorter interval than will a light liquid, and yet the weight of the liquid introduced per cycle will be constant. Because the float and its measuring device is operated solely by fluid level, the counter or other indicator 36 registers total liquid rise in terms of some convenient unit of volume such as barrels, with such a volumetric measuring system the total volume of the liquid which passes through the vessel on each cycle or upon a series of cycles is measured.

Because the cross-sectional area of the vessel is known and the weight-sensing device operates to dump a predetermined weight of liquid upon each cycle, the weight of the volume of liquid is directly proportional to the height and density of the liquid. Therefore, by knowing the weight which is accurately controlled by the sensing device A and knowing the height and density of said liquid, it is possible to determine very accurately the relative amounts of the components within the liquid mixture. In the case of oil and water, it is desirable to known how much oil and how much water is present within the liquid mixture introduced on a given cycle.

To illustrate how the determination of total weight as related to the total height will provide the necessary information to ascertain the relative amount of each component, a test unit was constructed with the liquid discharge or dump set at 100 lbs. weight per cycle, and the volume counter 36 designed to read in barrels. It was installed in a flow line from a well making oil and water. The water weighed approximately 350 lbs. per barrel, and the oil weighed approximately 300 lbs. per barrel. With this stream passing through the vessel 10, the net reading from the weight counter 25 divided by the net reading from the volume counter 36 gave the weight in pounds per barrel of the liquid. The relative proportion of the oil and water was readily determined by interpolating between the weight of pure water and oil. In this instance, a weight of 325 lbs. per barrel indicated a 50–50 mixture of oil and water.

In the form of the invention shown in FIG. 1, a weight-sensing device A is illustrated which is capable of accurately sensing the weight of the liquid within the vessel at two levels; in other words, the device must sense the weight when it is desired to close the inlet valve and open the outlet valve. Similarly, it must sense the weight when the inlet valve is to be closed and the outlet valve is to be open. Therefore, in effect, the particular sensing device A, which will be hereinafter described, is capable of sensing two different levels because the height to which the liquid rises within the vessel s directly related to the weight measurement. The sensing device A operates the pilot pressure control unit B to either apply pressure or release the same from the diaphragms of the inlet and outlet valves. At the same time, it applies a pulse each time that pressure is directed to the conductor 23 to the actuator 26 of the weight indicator 25, which indicator is of course representative of the weight being measured and the number of cycles which occur. Also, with the construction shown in FIG. 1 and as will be explained, pilot pressure is applied to or released from the upper end of the sensing device A to render it capable of accurately operating to sense the two levels above referred to which are representative of weight.

Although the sensing device A has been found preferable because it is a single unitary assembly capable of accurately sensing the two different levels, it is evident that it would be possible to employ two separate liquid level sensing devices, each of which would operate its own pilot pressure control unit B. One of such units would sense the upper level and the other would sense the lower level, but in such instance control equipment would have to be duplicated and would not be as economically attractive as is the single device A. However, the invention is not to be limited to a unitary assembly such as the device A because the particular method of determining the relative amounts of components in a liquid mixture may be accomplished so long as a predetermined weight of the liquid mixture is introduced and simultaneously therewith its highest liquid level is properly measured by means of a float or other similar means to provide a volumetric measurement.

It is also pointed out that the particular motor valves or the particular type of pilot pressure control unit B are subject to variation. Also, the particular type of counter to register each cycle and to therefore indicate weight is subject to variation. As will be hereinafter explained, the indications of the counters 25 and 36 may be converted to provide only a single indication of one of the components.

In FIGURE 2 the improved weight-sensing device A and the pilot control unit B are illustrated. It might be noted that where a sensing device comprises a diaphragm moving against a spring, proper sensitivity is best obtained by providing a relatively large diaphragm with a relatively "soft" spring. If a separate diaphragm and spring arrangement is used to actuate at the higher level in a vessel, its spring should be of a different value than the diaphragm and spring which would be responsive to the lower liquid level. Therefore, when a single control is to be used for sensing weight and must be responsive first to a low level of liquid and subsequently to a high level, it is difficult to obtain proper sensitivity at both levels if a fixed spring force is constantly acting against the diaphragm.

In order to overcome this problem and to make the single sensing device A applicable for the purpose, the pilot pressure is employed to automatically adjust or vary the spring force which is working against the diaphragm of the sensing device A. As will appear from the detailed description, the output signal of the pilot unit B actuates a means for automatically changing the force of the spring acting upon the diaphragm of the sensing device A. When the liquid reaches the upper level which indicates the predetermined weight of the liquid desired, a signal is directed from the pilot control unit B to close the inlet valve 12 and open the outlet valve 14. This same signal is also directed to the sensing device A and is utilized to change the spring setting to a lower value which will allow the diaphragm of the weight-sensing device A to be sensitive and accurate in controlling the pilot at the desired lower liquid level. As the liquid discharges down to the lower level, the pilot signal which closes the discharge valve and opens the inlet valve also automatically changes the setting of the spring of the device A to a higher value so that the device A will accurately operate at the desired upper level.

As shown in FIG. 2, the weight-sensing device A includes a casing 40 which is made of upper and lower sections connected together by bolts 41. Clamped between the sections at its peripheral edge is a sensing diaphragm 42. The diaphragm 42 is connected to an actuator block 43 by means of a bolt 44, whereby movement of the diaphragm will result in a similar movement of the block. A transverse opening 45 in said block is engaged by the end of an actuating rod 46 which extends outwardly through a tubular connection 47 which is secured to the pilot pressure control unit B. As will be explained, a movement of the actuator rod 46 by reason of motion of diaphragm 42 will control the actuation of the pilot pressure control unit B.

A cylindrical housing 48 is mounted in the casing 40 and is axially aligned with the axis or center point of diaphragm 42. As shown, the lower portion of the housing 48 extends entirely through the casing, but it is interrupted as shown at 49 and 50 to form a slot or annular area within which the diaphragm is movable. The surfaces 49 and 50 act as travel stops for motion of the diaphragm. The block 43, which is attached to and movable with the diaphragm, extends upwardly into the housing 48 and has a spring 51 engaged therewith. The upper end of the spring is engaged by a circular follower or disc 52 which is attached to the lower end of a piston rod 53. The rod 53 is secured to a piston 54 which is enclosed by a flexible element 55, the periphery of which is clamped between an annular flange 56 provided on the upper end of the housing 48 and an anular flange 57 formed on a cap member 58. Suitable bolts 59 secure the flanges together, and the flexible element 55 actually forms a long travel flexible element. The cap member 58 has a port 60 in the upper end of its wall, and such port has connection with the branch conductor 24 extending from the pilot pressure control unit B.

When pressure is introduced above the piston 54 to move the same downwardly, said piston will through its rod 53 move the follower or disc 52 downwardly within the housing 48, and this will increase the force of the spring 51 which is acting upon the sensing diaphragm 42. When the piston is in its uppermost position, as shown in FIG. 2, the spring value is reduced as compared to when the piston is moved downwardly. Upward movement of the piston is limited by an upwardly extending rod 61, which is in fact an extension of the piston rod 53. The upper end 61a of the rod is adapted to engage an adjusting screw 62 threaded into the upper end of a tubular extension 63 which is threaded onto the upper end of the cap 58. Downward movement of the piston is limited by a sleeve 64 which is threaded onto the upper end of the extension rod 61, the lower end of said sleeve being adapted to engage the upper end of the flanged collar 65 which is threaded into the upper end of the cap 58 and which surrounds the extension rod 61.

The line 19 which extends from the vessel communicates with the lower section of the casing 40 so that the hydrostatic head pressure of the liquid within the vessel will act against the underside of the sensing diaphragm. The equalizing line 20 is connected into the upper section of the case and equalizes any gas pressure in the upper end of the vessel 10 with the pressure in the area within the casing 40 above the sensing diaphragm 42. At the end of any particular cycle, the discharge valve 14 of the vessel 10 is open with the inlet valve 12 being closed; at this instant, the sensing diaphragm is in its upper position. As the diaphragm senses the discharge of the liquid downwardly to its lower level above the discharge conductor 13, the diaphragm 42 moves to a lower position, being moved to such position by the spring 51. Through the actuator rod 46, the pilot pressure control unit B is actuated to direct pilot pressure through the conductor 23 to the inlet valve diaphragm 12a and through the branch 23a to the diaphragm 14a of the outlet valve 14. This opens the inlet valve 12 and closes the outlet valve 14. At the same time, the pilot pressure is directed through the branch line 24 and into the cap 58 of the sensing device A, so that this pressure is applied to the piston 54. This moves said piston downwardly which results in a downward movement of the follower or disc 52 to apply additional loading to the spring 51, thereby changing the value of said spring. By proper adjustment of the travel, the spring force is adjusted to render the device A sensitive to proper motion of the sensing diaphragm 42 when the predetermined weight of liquid has entered the vessel 10.

As the diaphragm 42 senses the predetermined weight, it moves upwardly to swing the actuator rod 46 and again operate the pilot pressure control unit B. Upon this actuation, the pilot pressure control unit B will vent or release the pressure from the conductor 23 to close the inlet valve 12 and open the outlet valve 14. At the same time, pressure will be vented from the branch line 24 extending to the device A whereby the piston 54 may be moved to its upper position by the spring 51. This action changes the value of the force of the spring 51 so that the diaphragm will be properly sensitive to the liquid level which is reached upon discharge of the particular batch of liquid which was introduced during that particular cycle.

The specific pilot pressure control unit B is subject to variation, and any of the well known control units now on the market may be employed. It has been found, however, that a pilot pressure control unit such as shown in my prior Patent No. 3,064,474, issued Nov. 20, 1962 is particularly satisfactory. As shown in FIG. 2 this unit includes an actuating shaft 70 to which the actuating rod 46 is secured, whereby swinging of said rod will rotate the shaft 70. A bracket 71 is secured to and rotates with the shaft 70 and has a screw 72 abutting the lower end of a pivoted actuating bar 73; the opposite end of said bar has a spring 74 acting thereagainst which tends to urge the bar into contact with screw 72.

Above the actuating bar is a pivoted lever 75 having an adjustable block 76 mounted thereon. The lower end of the block has a contact point 77 engaging the bar 73. When the actuating rod 46 is swung by reason of movement of the diaphragm 42, the actuating bar 73 is also swung to act against the lever 75 to swing it on its pivot 75a.

The outer end of the lever 75 engages the lower end of a valve rod 78. The valve rod carries a lower valve which may be termed a vent valve 79 and an upper valve 80 which controls the flow of the pilot pressure supply entering through line 21. The outlet line 22 which extends to the conductor 23 and the branch line 24 is connected into a suitable valve housing 81.

By observing FIG. 2 it will be seen that when the valve 80 is seated the pilot supply cannot pass to the outlet line 22, but instead the outlet line and all other conductors connected therewith are vented because the lower vent valve 79 is open. Upon upward movement of the valve rod 78, said lower vent valve is seated, and the upper valve 80 is opened to admit pilot pressure to the outlet 22. In the operation of the control unit B, the valves 79 and 80 are in the position shown in FIG. 2 when the inlet valve 12 is closed and the outlet valve 14 is open. At this time the piston 54 of the weight-sensing device A is in its raised position. When the actuator rod 46 is swung to seat the vent valve and open the upper valve 80 of the unit B, pilot pressure is conducted to the diaphragms 12a and 14a to close the outlet valve and open the inlet valve; at the same time, this pilot pressure is conducted to the piston 54 of the weight-sensing device A to move the piston downwardly and change the value of the spring 51 against which the sensing diaphragm 42 of said device A is acting. It is therefore evident that an automatic adjustment of the value of the spring 51 is obtained, and the unit A is thereby made sensitive and accurate in measuring the weight by being responsive to both the higher level and the lower level which the liquid mixture attains within said vessel.

As previously noted, the single weight-sensing device is preferable because it eliminates the use of duplicate controls actuated in accordance with the different levels. However, it is possible to accomplish the purposes of this invention by providing a separate control responsive to the uppermost liquid level which would be reached in accordance with the predetermined weight and another control responsive to the lower level which is reached at the end of the discharge of each cycle.

In FIG. 1 a weight counter 25 which is actuated by a pulse each time that the pilot pressure control unit B is actuated is provided and is an indication of the weight of the total number of cycles. Also, the liquid volume counter 36 totals the volume which has passed through the vessel by reason of the various cycles of operation. As has been noted, the relationship between the weight counter and the liquid volume counter provides the required information as to the relative amounts of the components in the liquid mixture which is passing through the apparatus. It may be desirable to provide a single indicator which will indicate and record the net volume of one of the liquids. In the metering of well streams it might be desirable to mechanically or otherwise correlate the indications of the two counters so that the net amount of one of the liquids, as for example the net barrels of oil or the net barrels of water, be registered on a single direct reading indicator, and in FIGS. 3 and 4 one type of mechanism for accomplishing this purpose is schematically illustrated. Referring to FIG. 3, the float 27 rotates the measuring wheel 29 and its shaft 30 in accordance with rise in liquid level. Through the one-way clutch or ratchet assembly 32 a gear 85 is driven during the rise of liquid level. This gear drives the gross counter 36 through a meshing gear 85a. The shaft 30 is formed with an extension 30a which is connected to one of the gears 86 of a differential drive device 87.

For directing the information of the weight counter 25 into the differential device 87, a pressure line 88 extends from the branch line 26a which carries the pulse to the actuating mechanism 26 of the counter 25. This pulse is conducted into a cylinder 89 having a piston 90 therein; a suitable spring 91 urges the piston 90 toward a lowered position within the cylinder. The piston rod 92 has connection with a gear rack 93 which is engaged with a gear 94 having a shaft 95. The shaft 95 is connected through a one-way clutch or ratchet assembly 96 with the shaft 95a of one of the differential gears 86a of the differential device 87. The piston and cylinder are actuated by the same pulse which actuates the weight counter 25, and thus one of the differential gears 86a is actuated each time that the counter 25 is operated. Similarly, the other gear 86 of the differential is under the control of the measuring wheel 29. The housing of the differential 87 is rotated in accordance with the relationship of rotation between gears 88 and 88a and through proper gearing 99 drives a net counter 97 which may read in net barrels of either oil or water.

It is evident that by proper design of the gears and the motion into the differential 87 the two rotary inputs which represent weight measurement and volume measurement will produce equal and opposite rotation of the housing of the differential, thereby producing a net rotation of the differential housing of zero; this would be accomplished when a liquid of constant density is moving through the vessel. In practice, the two counters 25 and 36 are "zeroed" with pure water or oil going through the meter. The stroke of the piston 90 is adjusted to produce "zero" net rotation by the pulse from the line 88. Assuming the device is "zeroed" with water and subsequently oil is introduced into the liquid passing through the vessel, the liquid will rise higher in the vessel in order to attain the predetermined weight. This will result in the float 27 moving higher during each fill and discharge cycle. Therefore, a greater motion will be fed into the differential by movement of the float due to the increased volume of the liquid; the ratio of the rotary motion from the volume count, as controlled by the float, to the weight count, as controlled by the piston 90, will increase and the housing of the differential device 87 will rotate in the direction of the rotation input from the volume side. Since this operates the net counter 97, such net counter may register the particular component, preferably oil, in barrels or other units of volume.

In actual practice there is an adjustable stop 98 associated with the gear rack 93 which is actuated by the piston 90. The rack travel stop will enable the piston to move with the pulse signal an amount to "equal" the volume of one of the liquids, such as water. In other words, the rotary motion of shaft 95a as controlled by the piston will be equal to that generated by the motion of the float when water is passing through the meter; the rotary motion will be dependent upon the density of the water and a scale adjacent said stop 98 may be calibrated in terms of salt water density. In effect, the resultant rotation of the differential case or housing 87 is actually the difference in gravities of the two liquids, such difference being the ratio between these gravities. Therefore, when the mechanism is "zeroed" on water, the density of the oil will determine the additional rotation of the differential housing 87 when the flow becomes pure oil, and this additional rotation must turn the net counter 97 to read the same as the gross counter when the flow is 100% oil. It is desirable that the gearing driving the net counter from the differential 87 be calculated for each ratio of densities to enable the net counter to read correctly in that oil volume. In commercial application of the device, a standard set of gears would be provided and factors utilized to correct the observed readings for various density combinations.

In FIGS. 5 and 6, another form of reading the net volume of oil is illustrated. In this form, the float 27 is connected through the cable 28 with a flanged measuring wheel 129. This measuring wheel is secured to the shaft 30 which connects through the clutch or ratchet assembly 32 to the gross counter 36. The wheel 33 and counterweight 34 are of course provided. The shaft 30 is formed with an extension 130 upon which is mounted a sector plate 131. The sector plate has a hub 132 which is surrounded by the hub 133 of a second sector plate 134. A set screw 135 may be utilized to place the two sector plates 131 and 134 in proper position with respect to each other, as for example the position shown in FIG. 6. A striker pin 136 is secured to the measuring wheel 129 and is adapted to move between the edge 131a of the sector plate 131 and the edge 134a of the sector plate 134.

Actually the sector plate 131 and 134 comprise a single segmental-type member made in two sections with the two sections adjustable with respect to each other so as to properly locate their edges 131a and 134a which would permit a travel of the measuring wheel 129 a predetermined number of degrees without engaging said segmental member. The hub 132 of the sector plate 131 has a shaft extension 137 which operates through a one-way clutch or ratchet assembly 138 and proper gearing 139 to drive the shaft 140 of a net counter 141.

In the operation of this form, the sector plates 131 and 134 are adjusted with respect to each other to properly adjust the edges 131a and 134a with respect to the striker pin. The adjustment is such as to permit motion of the striker pin as the measuring wheel 129 oscillates due to water passing through the vessel 10; in other words, when pure water is passing through the vessel the striker pin 136 may move through its arc without engaging the edges of the sector plates 131a and 134a.

With the unit adjusted in this manner, if oil becomes part of the liquid moving through the vessel, the liquid level will rise and fall through a greater interval upon each cycle, and this will impart a greater oscillatory motion to the striker pin 136. The pin will therefore contact and move the sector plates 131 and 134 through an angle which is proportional to the additional volume of liquid due to the liquid stream becoming lighter in weight. This is proportional to the percentage of oil and water in the mixture and to the ratio of densities.

With a liquid slug of constant weight, a scale 142 may be placed on the sector plate 131 which will enable the gap between edges 131a and 134a to be set for any particular salt water density and thus "zero" the structure shown in FIGS. 5 and 6 with respect to water. The gearing 139 which is driven by the one-way clutch or ratchet assembly 138 has a ratio which is related to the ratio of the liquid densities and the net counter will thus produce a direct reading. The counter 36 will provide a gross liquid volume measurement while counter 141 will give a net volume. If the gearing 139 is omitted, a factor would be applied to the net reading to fit the particular combination of densities.

From the foregoing it will be seen that an apparatus is provided which will permit the accurate determination of the relative amounts of components in a mixed liquid stream. The apparatus is particularly applicable for use in measuring and metering well streams consisting of oil and water. The basic concept involves introducing a predetermined weight of a liquid mixture into a vessel and at the same time measuring the volume of the predetermined weight of liquid mixture. As shown in FIG. 1, the weight indication and the volume indication may be recorded separately or, as shown in FIGS. 3–6, mechanical determination of the relationship of the readings will permit the use of a net counter which will be a direct reading of the volume of oil in barrels or other units of volume. The apparatus may employ the single weight-sensing device A, which will properly control the entry and discharge of a predetermined weight of liquid mixture upon each cycle of operation; or, as previously pointed out, two sensing units which would sense the levels, both upper and lower, could be substituted for the single unit A. Also, any suitable type of pilot pressure control unit may be substituted for the unit B which is actuated by the weight-sensing device A.

The foregoing disclosure and description of the invention is illustrative and explanatory thereof, and various changes in the size, shape and materials, as well as in the details of the illustrated construction, may be made within the scope of the appended claims without departing from the spirit of the invention.

What I claim is:

1. A metering apparatus for determining the relative amounts of components in a liquid mixture which includes,
    an immovable vessel having an inlet in its upper portion and an outlet in its lower portion,
    an inlet valve in said inlet for controlling the admission of liquid mixture into the vessel,
    an outlet valve in said outlet for controlling the discharge of liquid mixture from said vessel,
    a weight sensing means communicating with the lower portion of the vessel in a plane below the outlet and responsive solely to the weight of the liquid mixture which is introduced through the inlet to measure the presence of a predetermined weight of liquid mixture in said vessel,
    means actuated by the weight sensing means and operably connected with the inlet and outlet valves to control said valves to admit a predetermined weight of liquid mixture into the vessel and to discharge the same from said vessel after liquid mixture of such predetermined weight has been admitted, and
    means within said vessel for measuring the maximum height to which said predetermined weight of liquid rises within the vessel to thereby determine the volume thereof.

2. A metering apparatus as set forth in claim 1, together with
    means actuated by the weight sensing means for indicating the weight of the liquid mixture, and
    means operated by said height measuring means for indicating the volume of the liquid mixture within the vessel.

3. A metering apparatus as set forth in claim 1, wherein the vessel has a constant cross-sectional area, and
    also wherein the means for measuring the height to which the liquid rises is a float element.

4. A metering apparatus for determining the relative amounts of components in a liquid mixture which includes,
    an immovable vessel having an inlet in its upper portion and an outlet in its lower portion,
    an inlet valve in said inlet for controlling the admission of liquid mixture into the vessel,
    an outlet valve in said outlet for controlling the discharge of liquid mixture from said vessel,
    a weight sensing means communicating with the lower portion of the vessel in a plane below the outlet and responsive solely to the weight of the liquid mixture which is introduced through the inlet to measure the presence of a predetermined weight of liquid mixture in said vessel,
    pressure-actuated means connected with the inlet valve for controlling the opening and closing of the same,
    pressure-actuated means connected with the outlet valve for controlling the opening and closing of the same,
    a pilot pressure control unit for applying and releasing pressure to and from the pressure-actuated means of said inlet and outlet valve,
    means operated by the weight sensing means for operating said pilot pressure control unit to actuate the inlet and outlet valves, whereby a predetermined weight of liquid is admitted to the vessel and is thereafter discharged, and
    means within said vessel for measuring the maximum height to which said predetermined weight of liquid rises within the vessel to thereby determine the volume thereof.

5. A metering apparatus as set forth in claim 4, together with
means actuated by the weight sensing means for indicating the weight of the liquid mixture, and
means operated by said height measuring means for indicating the volume of the liquid mixture admitted to the vessel on each operating cycle.

6. A metering apparatus as set forth in claim 4, together with
means actuated by the weight sensing means for indicating the weight of the liquid mixture,
means operated by said height measuring means for indicating the volume of the liquid mixture admitted to the vessel on each operating cycle, and
means for converting the total volume of liquid mixture into an indication of the net volume of one of the components of said mixture.

7. A metering apparatus for determining the relative amounts of components in a liquid mixture which includes,
a vessel having an inlet in its upper portion and an outlet in its lower portion,
an inlet valve in said inlet for controlling the admission of liquid mixture into the vessel,
an outlet valve in said outlet for controlling the discharge of liquid mixture from said vessel,
a weight sensing means communicating with the lower portion of the vessel in a plane below the outlet and responsive solely to the weight of the liquid mixture which is introduced through the inlet to measure the presence of a predetermined weight of liquid mixture in said vessel,
means actuated by the weight sensing means and operably connected with the inlet and outlet valves to control said valves to admit a predetermined weight of liquid mixture into the vessel and to discharge the same from said vessel after liquid mixture of such predetermined weight has been admitted, and
means within said vessel for measuring the height to which said predetermined weight of liquid rises within the vessel to thereby determine the volume thereof,
said weight sensing means comprising a single device including a sensing diaphragm having one side exposed to liquid in the vessel and its opposite side acted upon by a spring means, whereby said diaphragm senses the upper and lower levels to which the liquid in the vessel rises and falls in accordance with the predetermined weight of said liquid.

8. A metering apparatus as set forth in claim 7, together with,
means actuated by the weight sensing means to automatically change the force value of the spring means acting upon the sensing diaphragm each time that the liquid reaches its upper and its lower level.

9. A metering apparatus for determining the relative amounts of components in a liquid mixture which includes,
a vessel having an inlet in its upper portion and an outlet in its lower portion,
an inlet valve in said inlet for controlling the admission of liquid mixture into the vessel,
an outlet valve in said outlet for controlling the discharge of liquid mixture from said vessel,
a weight sensing means communicating with the lower portion of the vessel in a plane below the outlet and responsive solely to the weight of the liquid mixture which is introduced through the inlet to measure the presence of a predetermined weight of liquid mixture in said vessel,
pressure-actuated means connected with the inlet valve for controlling the opening and closing of the same,
pressure-actuated means connected with the outlet valve for controlling the opening and closing of the same,
a pilot pressure control unit for applying and releasing pressure to and from the pressure-actuated means of said inlet and outlet valve,
means operated by the weight sensing means for operating said pilot pressure control unit to actuate the inlet and outlet valves, whereby a predetermined weight of liquid is admitted to the vessel and is thereafter discharged, and
means within said vessel for measuring the height to which said predetermined weight of liquid rises within the vessel to thereby determine the volume thereof,
said weight sensing means comprising a single device including a sensing diaphragm having one side exposed to liquid in the vessel and its opposite side acted upon by a spring means, whereby said diaphragm senses the upper and lower levels to which the liquid rises and falls in accordance with the predetermined weight of said liquid.

10. A metering apparatus as set forth in claim 9, together with
means actuated by the weight sensing means to automatically change the force value of the spring means acting upon the sensing diaphragm each time the liquid reaches its upper and lower levels.

11. A metering apparatus for determining the relative amounts of components in a liquid mixture which includes,
a vessel having an inlet in its upper portion and an outlet in its lower portion,
an inlet valve in said inlet for controlling the admission of liquid mixture into the vessel,
an outlet valve in said outlet for controlling the discharge of liquid mixture from said vessel,
a weight sensing means communicating with the lower portion of the vessel in a plane below the outlet to measure the presence of a predetermined weight of liquid mixture in said vessel,
pressure-actuated means connected with the inlet valve for controlling the opening and closing of the same,
pressure-actuated means connected with the outlet valve for controlling the opening and closing of the same,
a pilot pressure control unit for applying and releasing pressure to and from the pressure actuated means of said inlet and outlet valve,
means operated by the weight sensing means for operating said pilot pressure control unit to actuate the inlet and outlet valves, whereby a predetermined weight of liquid is admitted to the vessel and is thereafter discharged,
means within said vessel for measuring the height to which said predetermined weight of liquid rises within the vessel to thereby determine the volume thereof,
means actuated by said weight sensing means for indicating the weight of the liquid mixture,
means operated by said height measuring means for indicating the volume of the liquid mixture admitted to the vessel on each operating cycle,
a differential device,
means for actuating said differential device in accordance with the indication of weight and the indication of volume, and
a net volume indicator operably connected with the differential device and actuated thereby to indicate the net volume of one of the components of the liquid mixture.

12. A metering apparatus for determining the relative amounts of components in a liquid mixture which includes,
a closed immovable vessel having an inlet and an outlet,
means for introducing the liquid mixture into said vessel through said inlet,
a weight sensing means disposed outside of the vessel and communicating with the interior of the vessel at a level below that of the liquid outlet, said weight sensing means having a movable weight sensing element which is directly exposed to the liquid in the vessel and which is responsive solely to the weight of the introduced liquid mixture to measure the presence of a predetermined weight of liquid mixture in said vessel, and means within said vessel for measuring the height to which said predetermined weight of liquid rises within said vessel to determine the volume of the liquid.

13. A metering apparatus as set forth in claim 12, together with means operated by said weight sensing means for indicating the weight of said liquid mixture, and means operated by said height measuring means for indicating the volume of the liquid mixture.

14. A metering apparatus as set forth in claim 12, wherein the closed vessel is one of constant cross-sectional area, and also wherein the means for measuring the height to which the liquid rises in said vessel is a float element.

References Cited

UNITED STATES PATENTS

| | | | |
|---|---|---|---|
| 1,205,986 | 11/1916 | Gipe et al. | 73—433 |
| 2,687,037 | 8/1954 | Saxe | 73—433 |
| 3,001,399 | 9/1961 | Smith | 73—223 |
| 3,206,977 | 9/1965 | Mayer | 73—224 |

RICHARD C. QUEISSER, *Primary Examiner.*

JAMES GILL, DAVID SCHONBERG, *Examiners.*

E. D. GILHOOLY, *Assistant Examiner.*